US009558288B1

(12) United States Patent
Boswell et al.

(10) Patent No.: US 9,558,288 B1
(45) Date of Patent: *Jan. 31, 2017

(54) WEBPAGE CREATION SYSTEM FOR ACCELERATED WEBPAGE DEVELOPMENT FOR AT LEAST ONE MOBILE COMPUTING DEVICE

(71) Applicant: INFORMATION CAPITAL EXECUTIVE MANAGEMENT, INC., Austin, TX (US)

(72) Inventors: Michael Boswell, Brentwood, TN (US); Webb Braughton, Nashville, TN (US); Michael Bowien, White House, TN (US); Ethan Crawford, San Angelo, TX (US); Eric Means, Nashville, TN (US)

(73) Assignee: INFORMATION CAPITAL EXECUTIVE MANAGEMENT, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,760

(22) Filed: Sep. 19, 2016

Related U.S. Application Data

(63) Continuation-in-part of application No. 15/246,067, filed on Aug. 24, 2016, and a continuation-in-part of application No. 14/976,076, filed on Dec. 21, 2015.
(Continued)

(51) Int. Cl.
*G06F 17/30* (2006.01)
*G06F 21/62* (2013.01)
*G06F 17/24* (2006.01)

(52) U.S. Cl.
CPC ......... *G06F 17/3089* (2013.01); *G06F 17/248* (2013.01); *G06F 17/30321* (2013.01);
(Continued)

(58) Field of Classification Search
None
See application file for complete search history.

(56) References Cited

U.S. PATENT DOCUMENTS 8,135,633 B1 * 3/2012 LeBaron ................ G06Q 20/10
705/24
2005/0102284 A1 5/2005 Srinivasan
(Continued)

*Primary Examiner* — Matt Kim
*Assistant Examiner* — David Luu
(74) *Attorney, Agent, or Firm* — Buskop Law Group, PC; Wendy Buskop

(57) ABSTRACT

A webpage creation system for developing mobile device specific webpages for at least one mobile computing device having a hypertext generator and a domain free interface traverser to simultaneously collect predefined data from different third party servers, store the collected data and maintain consistency throughout. The webpage creation system can have a replication feature, a plurality of common stylistic rules, a document processor, auto auditor, and domain free central indexer to merge predefined data into a mobile device specific webpage document template creating the mobile device specific webpage and storing the mobile device specific webpage. A plurality of self-generating data entry screens can develop the mobile device specific webpage and a plurality of computer instructions can convert the mobile device specific webpage to a mobile version, transmit the mobile version for display and maintain the mobile version for use on the mobile computing device.

24 Claims, 6 Drawing Sheets

Related U.S. Application Data

(60) Provisional application No. 62/203,350, filed on Aug. 10, 2015.

(52) U.S. Cl.
CPC .. *G06F 17/30371* (2013.01); *G06F 17/30554* (2013.01); *G06F 17/30867* (2013.01); *G06F 21/6218* (2013.01)

(56) References Cited

U.S. PATENT DOCUMENTS

| | | |
|---|---|---|
| 2009/0119329 A1 | 5/2009 | Kwon |
| 2010/0299586 A1 | 11/2010 | Yoo |
| 2011/0066606 A1* | 3/2011 | Fox .................. G06F 17/30867 707/706 |
| 2011/0154187 A1 | 6/2011 | Sadowski |
| 2013/0097279 A1 | 4/2013 | Polis |
| 2013/0198619 A1 | 8/2013 | Sidhu |
| 2014/0075283 A1 | 3/2014 | Coursol |
| 2014/0222553 A1 | 8/2014 | Bowman |
| 2014/0365256 A1 | 12/2014 | Duff |
| 2015/0026304 A1 | 1/2015 | Mukherjee |
| 2015/0040098 A1 | 2/2015 | Akins |
| 2015/0248337 A1 | 9/2015 | Adler |

\* cited by examiner

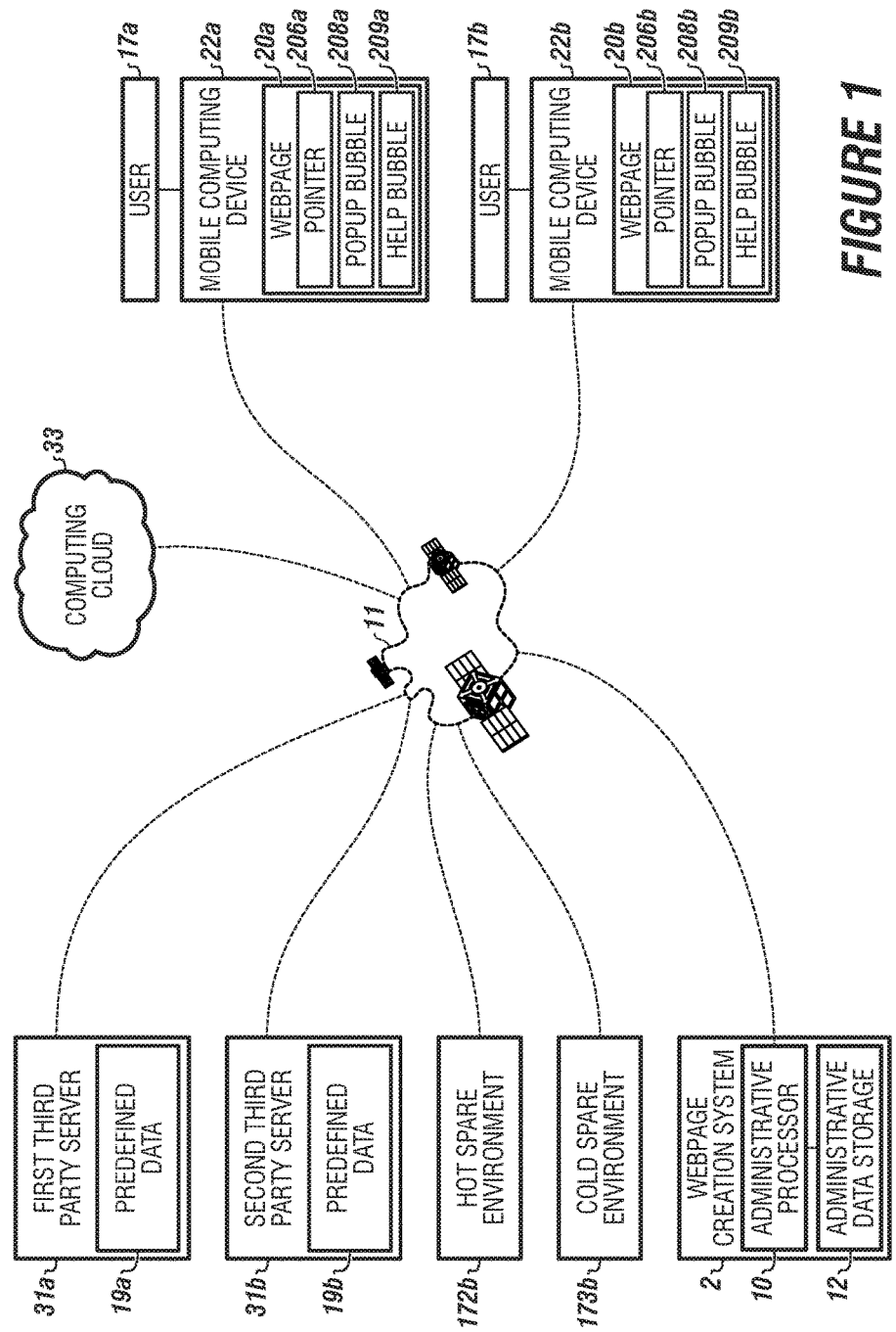

FIGURE 2A

| | |
|---|---|
| ADMINISTRATIVE DATA STORAGE | 12 |
| MOBILE DEVICE SPECIFIC WEBPAGE DOCUMENT TEMPLATE | 15 |
| PREDEFINED DATA | 19c |
| WEBPAGE CREATION SYSTEM | 2 |
| MOBILE DEVICE SPECIFIC WEBPAGE | 20 |
| PLURALITY OF SELF-GENERATING DATA ENTRY SCREENS | 99 |
| HYPERTEXT GENERATOR | 100 |
| DOMAIN FREE INTERFACE TRAVERSER | 102 |
| REPLICATION FEATURE | 104 |
| COMPUTER INSTRUCTIONS TO CONNECT TO A HOT SPARE ENVIRONMENT TO CAPTURE STREAMING REAL TIME DATA | 171 |
| COMPUTER INSTRUCTIONS TO CONNECT TO A COLD SPARE ENVIRONMENT TO CAPTURE PREDEFINED DATA AT A USER SELECTED UNIT OF TIME | 175 |
| LIST OF MOBILE COMPUTING DEVICES AND SPECIFICATIONS | 88 |
| COMPUTER INSTRUCTIONS TO INSTRUCT THE ADMINISTRATIVE PROCESSOR TO IDENTIFY A SPECIFIC MOBILE COMPUTING DEVICE FOR A MOBILE DEVICE SPECIFIC WEBPAGE | 89 |
| SEARCH SCREEN | 105 |
| STATIC DISPLAY OF IMAGES FEATURE | 115 |
| SLIDING CAROUSEL DISPLAY OF IMAGES FEATURE | 116 |
| CUSTOMIZABLE ELEMENT POSITIONING FEATURE | 117 |
| PLURALITY OF COMMON STYLISTIC RULES | 106 |
| CUSTOMIZABLE CASCADING STYLE SHEET | 107 |
| DOCUMENT PROCESSOR | 108 |
| CALENDAR PROCESSOR | 110 |
| COMPUTER INSTRUCTIONS INSTRUCT THE ADMINISTRATIVE PROCESSOR TO FORM A SEARCH SCREEN | 177 |
| ACTIVE/PASSIVE DATABASE RECORD LOCKING FEATURE | 200 |
| SLIDING CAROUSEL FUNCTION | 202 |
| AUTOMATIC HELP FEATURE | 204 |

FIGURE 5

TAX BILL
NOTICE AND DEMAND FOR PAYMENT OF TAX DUE

12/15/2015

| Field | Value |
|---|---|
| REAL OR PERSONAL PROPERTY PARCEL NUMBER: | 1234 |
| ADDRESS 1: | 123 SIMPLE STREET |
| ADDRESS 2: | SUITE 12 |
| CITY: | AUSTIN |
| STATE: | TEXAS |
| ZIP CODE: | 78701 |

YOU RECEIVED THIS BILL BECAUSE:
- WE HAVE RECOMPUTED YOUR TAX LIABILITY AND FOUND THAT YOU OWE TAX.

| Field | Value |
|---|---|
| TAX: | $1,234.00 |
| INTEREST: | $15.43 |
| PENALTY: | $10.00 |
| TOTAL AMOUNT DUE IF PAID BY 01/01/2016: | $1,259.43 |

HOW TO PAY:
- ONLINE: THE EASIEST WAY TO PAY.
-- GO TO WWW.TAX.XX.GOV AND FOLLOW THE PROMPTS FOR MAKING AN ONLINE PAYMENT
- PHONE: CALL (123) 456-7890
- MAIL: USE THE COUPON BELOW AND THE ENCLOSED ENVELOPE.

IF YOU DON'T PAY BY 01/01/2016:
- WE WILL IMPOSE ADDITIONAL INTEREST AND PENALTIES ON YOU.
- WE MAY BEGIN COLLECTION ACTIONS AGAINST YOU.

---

TAX BILL                                           PAY BY 01/01/2016

| REAL OR PERSONAL PROPERTY PARCEL NUMBER: | TOTAL AMOUNT DUE: | AMOUNT PAID: |
|---|---|---|
| 1234 | $1,259.43 | $ |
| | | $ |
| | | $ |
| | | $ |
| | TOTAL AMOUNT PAID: | $ |

WEBPAGE CREATION SYSTEM FOR ACCELERATED WEBPAGE DEVELOPMENT FOR AT LEAST ONE MOBILE COMPUTING DEVICE

CROSS REFERENCE TO RELATED APPLICATIONS

The present application is a Continuation in Part of co-pending U.S. patent application Ser. No. 15/246,067 filed on Aug. 24, 2016, entitled "METHOD FOR ACCERLATED WEBPAGE DEVELOPMENT FOR AT LEAST ONE MOBILE SPECIFIC DEVICE" and a Continuation in Part of co-pending application U.S. patent application Ser. No. 14/976,076 filed on Dec. 21, 2015, entitled "WEBPAGE CREATION TOOL FOR ACCELERATED WEBPAGE DEVELOPMENT FOR AT LEAST ONE MOBILE COMPUTING DEVICE", which claims priority to and the benefit of U.S. Provisional Patent Application Ser. No. 62/203,350 filed on Aug. 10, 2015, entitled "WEBPAGE DEVELOPER TOOL FOR ACCELERATED WEBPAGE DEVELOPMENT FOR MOBILE COMPUTING DEVICES". These references are herein incorporated in their entirety.

FIELD

The embodiments generally relate to a webpage creation system for accelerated creation and development of webpages usable on at least one mobile computing device.

BACKGROUND

A need exists for an easy to use webpage creation system that enables an unskilled developer or other user to develop webpages and webpages for mobile computing devices quickly and easily using data-entry screens to carry out a wide variety of searches and acquire a wide variety of extraction subsets of data without knowledge or skill in generating HTML.

A need exists for an easy to use webpage creation system that quickly and efficiently allows a webpage developer, a mobile device specific webpage developer or other user to create webpages and webpages for mobile computing devices without the need to learn a computing language or have knowledge of computer programming.

The present embodiments meet these needs.

BRIEF DESCRIPTION OF THE DRAWINGS

The detailed description will be better understood in conjunction with the accompanying drawings as follows:

FIG. 1 depicts an overview of components usable with the webpage creation system according to one or more embodiments.

FIGS. 2A-2B depict an administrative data storage usable with the webpage creation system according to one or more embodiments.

FIG. 5 is an exemplary filled in portable document format report template according to one or more embodiments.

Figure 2B:
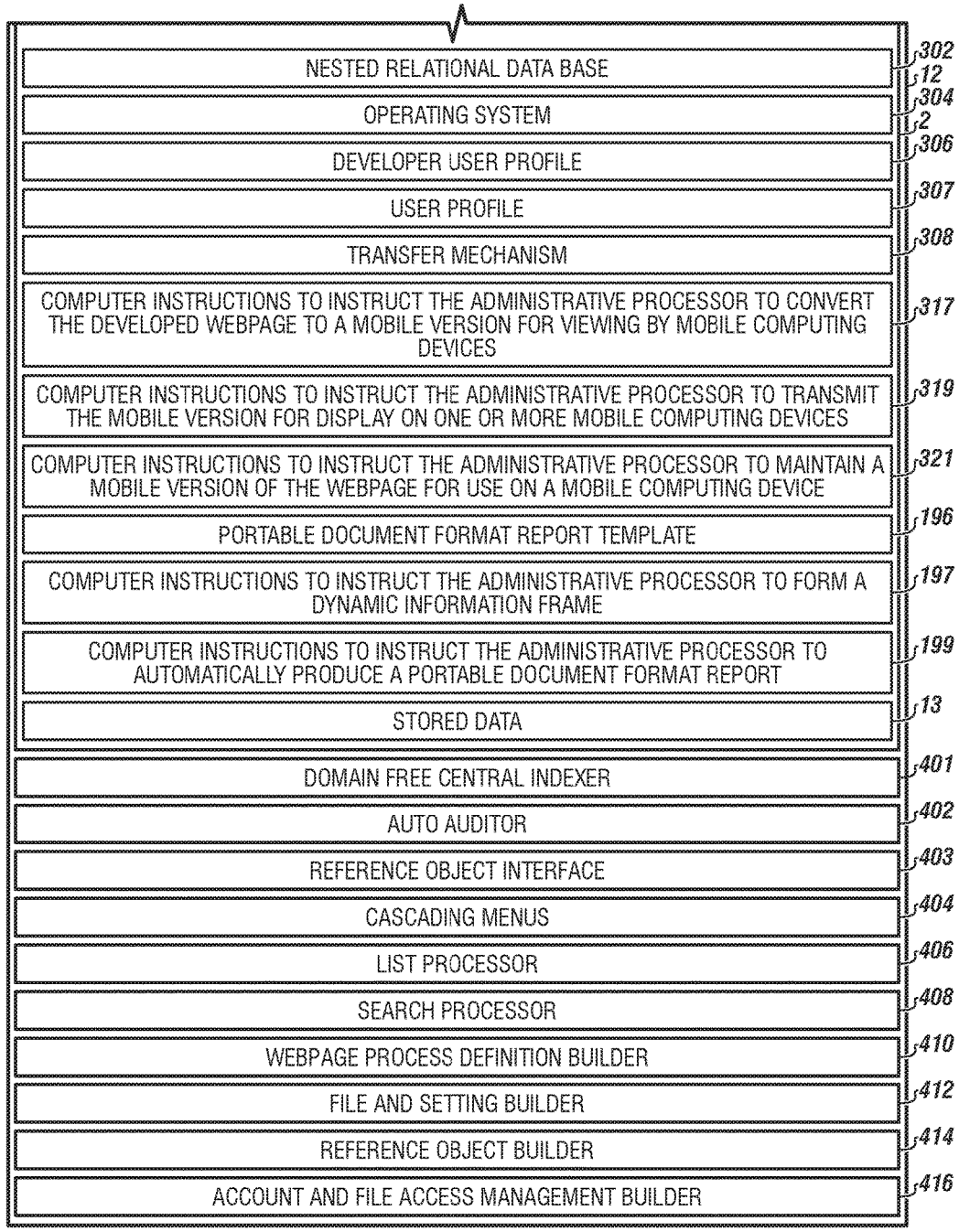

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The embodiments generally relate to a webpage creation system that enables an unskilled developer or other user to develop webpages and mobile device specific webpages quickly and easily using data-entry screens and a wide variety of search and extraction subsets for at least one mobile computing device.

The webpage creation system can have an administrative processor, an administrative data storage, and at least one mobile computing device, which can all be connected by a network.

The webpage creation system can take information from a plurality of servers and provide a set of rules and procedures so that multiple webpage developers and mobile device specific webpage developers can make webpages simultaneously with the same look and feel, but with different content from different sources.

A benefit for the webpage creation system is that the system can be faster for website creation and for a more maintainable website than current commercial developer toolkits.

Another benefit of the webpage creation system is that the webpage creator or mobile device specific webpage creator does not need to know the details of programming languages, such as HTML and can still generate webpages and mobile device specific webpages.

In embodiments, the webpage creation system can minimize the amount of programming language a webpage creator or mobile device specific webpage creator needs to know to create a usable webpage or mobile device specific webpage.

Another benefit of the webpage creation system is that the system can automatically and continuously, 24 hours a day 7 days a week, verify and authenticate data obtained from multiple third party servers, simultaneously.

Another benefit of the webpage creation system is that the system can standardize the look and feel of the webpage between an identified group of webpage creators and mobile device specific webpage creators using standardized rules and protocols.

A benefit for the webpage creation system is that the system can allow access to predefined data from multiple third party servers simultaneously and seamlessly.

Further embodiments generally relate to a webpage creation system for developing mobile device specific webpages for mobile computing devices.

The webpage creation system can have a hypertext generator and a domain free interface traverser to simultaneously collect predefined data from different third party servers, store the collected predefined data and maintain consistency among the collected predefined data.

The webpage creation system can have a replication feature.

The webpage creation system can have a plurality of common stylistic rules to enforce a common stylistic look and feel between webpages and mobile device specific webpages among an identified group of webpage creators and mobile device specific webpage creators.

The webpage creation system can have a domain free central indexer in the administrative data storage enabling bidirectional communication through the domain free interface traverser to identify a set of predefined data to gather from third party servers, gather the predefined data from the third party servers connected to the network, generate an index using the set of predefined data, incorporate modifications to the set of predefined data forming an updated index, search the updated index for a particular detail, and display the search results in the self-generating data entry screens allowing a user to select a particular record.

The webpage creation system can have an auto auditor in the administrative data storage to instruct the administrative processor to capture modifications to the predefined data as the predefined data is stored simultaneously on the plurality of third party servers, and to provide before and after values of the predefined data and a source of each modification to at least one self-generating data entry screen.

The webpage creation system can have a document processor to merge predefined data into a document template creating a mobile device specific webpage, and storing the mobile device specific webpage on an administrative data storage connected to an administrative processor.

The webpage creation system can have a plurality of self-generating data entry screens to create a mobile device specific webpage for a mobile computing device.

The webpage creation system can have various computer instructions, such as computer instructions to convert the mobile device specific webpage to a mobile version, computer instructions to transmit the mobile version for display on the mobile computing device, and computer instructions to maintain a mobile version of the mobile device specific webpage for use on a mobile computing device in the administrative data storage.

In embodiments, the webpage creation system can be a mobile device specific webpage creation system.

The term "active/passive database record locking feature" as used herein can refer to pessimistic/optimistic concurrency controls respectively. The webpage creator can specify which locking control to use for the webpage being created. When active locking is selected, the data records are locked on the retrieval of the data to display by the webpage created. If the lock is rejected, the webpage creator can define the webpage to show the data in inquiry only mode. If the lock fails, and the inquiry mode is selected, then the webpage is set to view only mode and the data is displayed and modifications are not allowed. If the lock fails, and the inquiry mode is not selected, then the webpage informs the user that the data is currently being modified by another user and who that user is. When passive mode is selected, the data records are retrieved and displayed on the webpage. When the user makes modifications to the data and requests the administrative process to save the changes, the administrative process tests to see that no changes to the data have been made since being retrieved using active locks. If the data has changed, then the update is rejected, otherwise the update is accepted.

The term "administrative processor" as used herein can refer to a computer. In embodiments, the term "administrative processor" can refer to a cloud based processor and/or a non-cloud based processor that can be configured to receive data via a network, which can include computer instructions for performing analytic computations and maintaining user profiles and corporate profiles for the development of webpages and mobile device specific webpages.

The term "administrative data storage" as used herein refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals. The administrative data storage can contain various computer instructions to instruct the administrative processor to perform various tasks.

The term "calendar processor" as used herein can refer to a processor with a data storage containing computer instructions that instruct the processor to generate a calendar, a message, inter-user messages, or combinations thereof on the webpage. In embodiments, each user will be able to query an administrative processor to produce a calendar of events from previously entered data in the administrative processor while producing reminders of calendar events, as an alarm providing simultaneous notifications and scheduling.

The term "cold spare environment" as used herein can refer to a cold spare backup server with a cold spare data storage. The cold spare data storage can be updated in a time specified frequency, such as every 72 hours. The data files on the cold spare server can be received from an administrative data storage replication feature. This cold spare backup processor and cold spare data storage can hold data files in a "stale state". The cold spare backup processor can be used to inquiry processes off-loading the administrative data storage when the data required is not time sensitive. In embodiments, the cold spare environment can capture predefined data at developer user selected time intervals. It should be noted that when a hot spare environment is used, the hot spare environment can capture streaming real time data twenty-four hours a day and seven days a week.

The term "customizable cascading style sheet (CSS)" as used herein can refer to a plurality of computer instructions in the administrative data storage that in a predefined manner, define a look and feel of elements on a webpage for use on a mobile computing device or another computing device. The customizable cascading style sheet can be used for describing a presentation of the self-generated forms that the webpage creation system can automatically develop. The style sheet language can contain previously defined sections that have been determined by the plurality of common stylistic rules imposed by the webpage creation system. An example can be which font to use on a definition used in a data entry field label. The developer user can have access in one location to change the font, and the result can be that all field labels will reflect that change of font.

The term "developer user profile" as used herein can refer to a defined set of access rights and permissions in the administrative data storage given to a developer user ID by an administrative processor. The administrative processor can generate a set of access permissions that can allow the developer user ID to access rights of tools and predefined data for use in developing a webpage or a mobile device specific webpage, upon successful log in of the webpage creator, which can be a developer user or another user. For example, a junior developer can have access only to create a data entry screen definition, but not have access to modify any existing data entry screen definitions and a senior developer profile can have full access to all processes, such as to both create and modify both new and existing data entry screen definitions.

The term "document template" as used herein can refer to a document that can be generated by a processor, such as a WORD® document using computer instructions such as WORD® made by Microsoft stored in a data storage.

The term "document processor" as used herein can refer to computer instructions that can produce documents based on previously defined templates. Each document produced can include data fields stored in an administrative data storage. The document processor can enable a creator of a webpage or a mobile device specific webpage to replace tokens with data elements, such as to write words, store words, edit and navigate words on a webpage that previously had tokens in the template, which can be a string name.

The term "domain free interface traverser" as used herein can refer to computer instructions that transfer predefined data between third party servers connected via a network, wherein the predefined data can be based on user defined parameters from a user profile, and optionally, these computer instructions can enable the predefined data to transfer remotely between third party servers. The domain free interface traverser can control communication, data delivery and access permission to and from each third party server connected to the network while maintaining data integrity of all data processed for each third party server.

The term "dynamic information frame" as used herein can refer to a window that is inside the generated and surround the webpage. Each webpage can have at least 1 dynamic information frame on a webpage and is designed to allow an unlimited number of dynamic information frames on the webpage. In embodiments, the number of dynamic information frames can be limited by the browser being used on the mobile computing device. The dynamic information frames can be nested, increasing the number of dynamic information frames. Each dynamic information frame can contain a webpage generated by the webpage creation system, a portable document format document, information from a third party server, a map or the like. The dynamic information frame can be created using computer instructions for forming the dynamic information frame stored in the administrative data storage.

The term "inquiry" as used herein can refer to a tool, like a search engine or similar device that via a network or direct connection, can pull data from an administrative data storage using particular webpage creator or mobile device specific webpage creator established criteria.

The term "integrity" as used herein can refer to having accurate and consistent data as of a specific date and time over its lifecycle.

The term "hot spare environment" as used herein can refer to a hot spare backup server with a hot spare data storage. The hot spare data storage can be updated as replication transactions are received from an administrative data storage replication feature. This hot spare backup server and hot spare data storage can be held in a stand-by mode to take over if the administrative data storage fails. The hot spare server can be used for inquiry processes off-loading the administrative data storage.

The term "hypertext generator" as used herein can refer to a set of programs running on an administrative server that interprets requests received from web users' browser devices. From the received request, an HTML response is generated, tailored according to the end users' device and sent back to the web users' browser program that made the request. Once the web users' browser receives the response, it then interprets the generated HTML code received rendering any new view and/or other actions specified for the device.

The term "mobile computing device" as used herein can refer to, but is not limited to, a laptop, a computer, a kiosk with a kiosk processor and a kiosk data storage, a tablet computer, a bar code reader, a hand held processor, a wearable computer, or another form of computer that can (i) receive and display information from a network, (ii) bi-directionally communicate and (iii) use a data storage and a display connected to the mobile computing device processor. The term "mobile computing device" as used herein can refer to a cellular phone, a smart phone, a smart watch, a wearable computer, or combinations thereof which have a processor, a data storage, a display and an ability to bi-directionally communicate with a network.

The term "multiple images" as used herein can refer to multiple photos, diagrams, digital logos, related images, and combinations thereof.

The term "nested relational database" as used herein can refer to a collection of tables containing rows and columns and at least one column will have a unique identifier for the table. The data can be stored in cells that have an attribute value, multiple attributes in a row are called tuples and multiple tuples in one table are referred to as a relation. The nested relational database allows a cell to contain another table.

The term "network" as used herein can refer to, but is not limited to, a local area network, a wide area network, a global communication system, a satellite network, a cellular network, the computing cloud, and combinations thereof.

The term "operating system" as used herein can refer to an operating system that the webpage creation system can use to simultaneously operate two different databases. In embodiments, the operating system can be a LINUX® operating system, a MICROSOFT WINDOW® operating system or an IBM/AIX® operating system.

The term "portable document format report template" as used herein can refer to a template stored in the administrative data storage.

The term "plurality of common stylistic rules" as used herein can refer to a set of rules that are created by a hypertext generator. The set of created common stylistic rules can then be stored in the data storage of the administrative processor for a particular project. For example, the common stylistic rules can make all screens for a particular project look similar in the representation to the many users. The common stylistic rules are different between mobile devices and other devices. The common stylistic rules can control a look on the screen, enabling all developer users to keep consistent "look and feel" on individual screens. This feature when followed, the feature of common stylistic rules, enables all users to consistently navigate all screens of all applications generated by the webpage creation system of this application without having to learn new navigation rules for each new application.

Examples of applied common stylistic rules can be seen in generated forms created from the predefined data which contain global processing actions that appear at the top of the screen in computing devices, and simultaneously in a hidden layer accessible with a touch on a mobile computing device. In embodiments, the common stylistic rules control menu placement, and all fields such as labels and input pairs in nested relational data views.

The term "pointer" as used herein can refer to an element controlled by a hand, stylus, or a mouse, which can allow for navigation between design pages of the webpage creation system as well as between elements on a generated webpage or a generated mobile device specific webpage. Any appearance, or design feature of the pointer, such as looking like a fish, or looking like a hand, can be controlled by a browser program of the user's client device.

The term "popup bubble" as used herein can refer to a hidden element that can contain data fields that can become visible when a user selects or clicks on a visual element to cause the hidden element to become visible. The popup bubble can enable navigation through grid elements (row and column elements) via "next" and "previous" buttons within the popup bubble. A "close" button and a "cancel" button within the popup bubble can be used to hide the now visible hidden element in two different ways. The "next" button can cause (i) entered data modifications to be applied to a row being displayed, and (ii) a user or developer user to traverse forward through rows showing column data of a generated webpage or a generated mobile device specific webpage. The "previous" button can cause (i) entered data modifications to be applied to a row being displayed, and (ii) a user or developer user to traverse backward through rows showing column data of a generated webpage or a generated mobile device specific webpage. The "close" button can cause user or developer user entered data changes to be applied to a generated webpage or a generated mobile device specific webpage and saved, and hide the now visible element to a row being displayed. The "cancel" button can cause proposed changes to a row being displayed to be disregarded and hide the now visible element.

The term "help bubble" as used herein can refer to a hidden area which can be shown once a pointer clicks on a help icon. The help bubble can contain information relating to the functionality of the embodiments, and/or the intended meaning and use of a field of data, dependent on the location of the help icon. In embodiments, the popup bubble can contain a help bubble or multiple help bubbles.

The term "predefined data" as used herein can refer to data identified using a webpage creator's or a mobile device specific webpage creator's defined parameters. Predefined data can be defined in a specific format from a third party server. Predefined data can contain multiple fields, or attributes, each attribute or field having been defined by a third party server. An example of this data can be a set of data records containing information about person, such as a person's physical address and a person's phone contact information. Another example of predefined data can be a set of data representing codes used by the third party system, and the definition of each code. Another example of predefined data can be a set of data, which can contain file names for specified images and the corresponding image files, such as pictures. Still another example can be a set of digital documents, which can pertain to a specific event, for example, documents used in a legal litigation case. Another example can be data records that conform to a definition of fields agreed upon by multiple third party systems, which can be searched upon in a straight forward fashion, much like the Dewy Decimal System.

The term "replication feature" as used herein can refer to computer instructions in the administrative data storage that are configured to provide a redundant storage of predefined data among more than one server. The replication feature can provide a real time mirror of data files located on an administrative data storage server as replicated to other third party servers. The administrative server data files can be simultaneously replicated to multiple servers.

The term "required data entry field" as used herein can refer to a data entry field that a user or developer user is required to enter before being allowed to save or modify a webpage or a mobile device specific webpage or data on the webpage or the mobile device specific webpage.

The term "self-generating data entry screens" as used herein can refer to computer instructions in the administrative data storage that instruct the administrative processor to generate an HTML form, with label and field entry pairs for the purpose of data entry. An example of a self-generating data entry screen can be the generation of a data entry screen which tracks vendor information, such as a vendor name and telephone number, and related information such as customer names and purchasing histories for those customers related to the vendor.

The term "sliding carousel function" as used herein can refer to computer instructions in the administrative data storage that generate an "image container" on the self-generating data entry screens that enable display of multiple image files input by a developer user or a user, one image at a time. The images can be a plurality of graphic images, either digital or analog, such as photographs, video, a portable document format, a spread sheet, a text message, or an email. In embodiments, the sliding carousel function can enable controlled viewing of multiple images simultaneously on the webpage or the mobile device specific webpage generated by the webpage creation system for at least one mobile computing device in a compact sequentially scrolling display. There are at least three different ways to navigate this function through each image file, (1) click a desired image in a row of images that is displayed above a currently displayed image, (2) click on one of a pair of directional arrows displayed overlaying a currently displayed image, the arrows indicating direction of image movement, such as right to left or left to right (also known as back to front); and (3) a swipe using a finger or a stylus on a currently displayed image, the swipe moving in the direction a user would like to view the images of the sliding carousel function.

The term "third party servers" as used herein can refer to a plurality of computers with processors and data storages that are connected to the network and are in communication with the administrative processor.

The term "transfer mechanism" as used herein can refer to computer instructions configured to transfer webpages or mobile device specific webpages between the administrative processor to third party servers, which can be connected to the network for access by the at least one mobile computing device. In embodiments, the transfer mechanism can be stored in administrative data storage for access by an administrative processor enabling transfer of the webpage or the mobile device specific webpage to another administrative processor connected to the network using a single developer user profile, or a user profile.

The term "user" as used herein can refer to a person that is not a webpage developer or a mobile device specific webpage developer that is the operator of a webpage or a mobile device specific webpage generated by the webpage creation system.

The term "user profile" as used herein can refer to a user name, as tied to access and privileges to sections of the administrative data storage as defined by developer users.

The terms "webpage creator or mobile device specific webpage creator" as used herein can refer to an author, such as person or a computer, charged with creating a webpage or a mobile device specific webpage using predefined data from multiple third party servers.

The terms "webpage and mobile device specific webpage" as used herein can refer to a final product usable on mobile computing devices and other devices connected to the network created by the webpage creation system and the webpage creator or the mobile device specific webpage creator written in a hypertext markup language HTML.

The embodiments relate to a mobile device specific webpage creation system for developing a mobile device specific webpage for at least one mobile computing device, which can be a tablet, a wearable processing device, a smart cellular phone, or any known mobile or desktop device that has a browser and a network connection.

The webpage creation system can include an administrative processor in communication with a network.

In embodiments, the administrative processor can be a laptop computer, a server, or even a plurality of connected computers communicating together in parallel or in series.

In embodiments, the network can be a satellite network, a cellular network, another global communication network, a local area network, or combination thereof.

An administrative data storage can be in communication with the administrative processor. The administrative data storage can have various elements and computer instructions to instruct the administrative processor to perform various tasks. Notably the administrative data storage can have a mobile device specific webpage document template, which can be auto filled in embodiments.

The administrative data storage can have a list of mobile computing devices and specifications of those mobile computing devices, such as the memory capacity of a device, the size of the screen, the level of brightness of the screen and the manufacturer specification for the device. This list can be stored in the administrative data storage for use in creating the mobile device specific webpage.

The administrative data storage can contain computer instructions configured to identify a specific mobile computing device for a mobile device specific webpage. The computer instructions can match specifications of a selected device to elements of a mobile device specific webpage, and in embodiments, can size the page to the display of the selected mobile computing device.

The administrative data storage can have a plurality of self-generating data entry screens for entering and storing data for use in the mobile device specific webpage.

A hypertext generator can be stored in the administrative data storage to instruct the administrative processor to automatically generate hypertext for the mobile device specific webpage using predefined data.

A domain free interface traverser can be stored in the administrative data storage configured to automatically collect, store and maintain consistency of predefined data collected from a plurality of third party servers using the network. The third party server can be multiple types, including but not limited to, a stock photo server, a finance server, a social media server, or a video streaming server.

A replication feature can be stored in the administrative data storage to instruct the administrative processor to maintain integrity of the predefined data to prevent loss of the predefined data while simultaneously duplicating the predefined data to a hot spare environment or a cold spare environment.

A plurality of common stylistic rules can be stored in the administrative data storage to instruct the administrative processor to enforce a common stylistic look and feel for use on the mobile device specific webpage, and maintain consistency between additionally developed mobile device specific webpages for the selected mobile computing device.

A domain free central indexer can be stored in the administrative data storage enabling bidirectional communication through the domain free interface traverser to identify a set of predefined data to gather from third party servers, gather the predefined data from the third party servers connected to the network, generate an index using the set of predefined data, incorporate modifications to the set of predefined data forming an updated index, search the updated index for a particular detail, and display the search results in the self-generating data entry screens allowing a user to select a particular record.

An auto auditor can be stored in the administrative data storage to instruct the administrative processor to capture modifications to the predefined data as the predefined data is stored simultaneously on the plurality of third party servers and provide before and after values of the predefined data and a source of each modification to at least one self-generating data entry screen.

A document processor can be stored in the administrative data storage to instruct the administrative processor to merge the predefined data into an identified mobile device specific webpage document template automatically, and generate the mobile device specific webpage for the specific mobile computing device, while simultaneously storing the generated mobile device specific webpage in the administrative data storage.

Additionally, computer instructions can be stored in the administrative data storage to instruct the administrative processor to transmit the mobile device specific webpage via a network for display on the specific mobile computing device.

A calendar processor can be stored in the administrative data storage to instruct the administrative processor to produce a calendar on the mobile device specific webpage.

In embodiments, the administrative processor and the administrative data storage can be part of a computing cloud.

In embodiments, the predefined data can include digital content, such as digital video digital images, such as photos, and analog information, such as graphic images.

The webpage creation system can include a nested relational database in the administrative data storage for access by the administrative processor for developing the mobile device specific webpage for at least one mobile computing device.

In embodiments, the digital content, digital images and analog information can be retrievable and accessible by an inquiry which can be inputted by a user using a mobile computing device to the nested relational database in the administrative data storage.

An operating system can be stored in the administrative data storage for access by the administrative processor for developing the mobile device specific webpage for at least one mobile computing device.

Each web developer using the webpage creation system can create and store a developer user profile in the administrative data storage for access by the administrative processor for developing the mobile device specific webpage for at least one mobile computing device.

A transfer mechanism can be stored in the administrative data storage for access by an administrative processor enabling transfer of the mobile device specific webpage to another administrative processor connected to the network using a single developer user profile, or a user profile.

The webpage creation system can include in the administrative data storage, an active/passive database record locking feature for instructing the administrative processor to control access to modify the predefined data to maintain predefined data integrity.

The webpage creation system can include a sliding carousel function in the administrative data storage to instruct the administrative processor to control viewing of multiple images simultaneously on the mobile device specific webpage generated by the webpage creation system for at least one mobile computing device in a compact sequentially scrolling display.

An automatic help feature can be stored in the administrative data storage to instruct the administrative processor to serve as an aid to a mobile device specific webpage creator using the webpage creation system, enabling a user to operate a pointer, to touch or link to an element on the mobile device specific webpage, extract the predefined data, and display the predefined data in a help bubble on the mobile device specific webpage of the at least one mobile computing device.

Additional computer instructions can reside in the administrative data storage to present a search screen configured with a look and feel identical to at least one of the self-generating data entry screens on the webpage template. The computer instructions to present the search screen can further include a static display of images feature and a sliding carousel display of images feature.

The webpage creation system can include a customizable cascading style sheet in the administrative data storage for use with the plurality of common stylistic rules.

The webpage creation system can connect with a hot spare environment to capture streaming real time data twenty-four hours a day and seven days a week, as well as connect with a cold spare environment that can capture the predefined data at developer user selected time intervals.

The webpage creation system can include a dynamic information frame configured as a web window within a web window, each web window can contain, but is not limited to, different self-generated data entry screens, a portable document format document, or third party server's webpage.

The dynamic information frames can be static creations or dynamic creations on the generated mobile device specific webpage.

In embodiments, the webpage creation system can include at least one required data entry field as defined by a developer user.

The webpage creation system can include a portable document format report template for automatic population of predefined data into the portable document format report template automatically producing a portable document format report comprising a real or personal property parcel number, an address one, an address two, a city, a state, and a zip code.

The webpage creation system can include a reference object interface in the administrative data storage enabling the domain free interface traverser or the administrative processor to install predefined data into a fake file to control user access to the predefined data and to keep confidential a portion of the predefined data from a user without credentials.

The webpage creation system can include a cascading menu generated at login using the domain free interface traverser to access self-generating data entry screens on at least one of the third party servers.

The webpage creation system can include a list processor for creating a dynamic listing of the predefined data from a plurality of third party servers via the domain free interface traverser for inquiries into at least one of the self-generating data entry screens.

The webpage creation system can include a search processor for collecting search criteria for predefined data from a plurality of third party servers via the domain free interface traverser and to search any generated updated index.

The webpage creation system can include a webpage process definition builder enabling creation of self-generating data entry screens layout, validity checks on user selected fields, and simultaneously provide a standardized layout for a mobile device webpage enforcing common stylistic rules and a common look and feel.

The webpage creation system can include a file and settings builder for identifying predefined data for gathering across the third party servers using the domain free interface traverser, creating files that contain gathered predefined data, and storing the created files in the administrative data storage.

The webpage creation system can include a reference object builder for identifying predefined data for gathering across the third party servers using the domain free interface traverser, creating fake files that contain a subset of gathered predefined data, and storing the created fake files in the administrative data storage.

The webpage creation system can include an account and file access management builder to control individual user access and management access to actual files and fake files and replication of the actual files.

Turning now to the Figures, FIG. 1 depicts an overview of components usable with the webpage creation system according to one or more embodiments.

The webpage creation system 2 can be used to create mobile device specific webpages for at least one mobile computing device 22a and 22b, which can be connected to a network 11, which in turn can connect to a computing cloud 33.

The webpage creation system can use an administrative processor 10, which can be in communication with the network 11 and can further be in communication with an administrative data storage 12.

The webpage creation system can reside partly in the administrative data storage and can communicate with a first third party server 31a containing predefined data 19a and a second third party server 31b containing predefined data 19b. The first and second third party servers can connect to the network 11.

A hot spare environment 172b and a cold spare environment 173b can be in communication with the network 11.

The hot spare environment and the cold spare environment can be usable with the webpage creation system. The hot spare environment can have a hot spare backup processor connected to the network with a hot spare data storage. The cold spare environment can have a cold spare backup processor connected to the network and a cold spare data storage. Mobile computing device webpages can be stored in both the hot spare and cold spare environments.

Each mobile computing device 22a and 22b can be operated by a mobile device specific webpage developer user or by a plurality of users 17a and 17b. Each user can have a mobile computing device for accessing the webpage creation system and for viewing product produced using the webpage creation system.

In embodiments, the webpage creation system can be accessed from a computer, such as a laptop, a tablet computer, or a standalone computer.

Each mobile computing device 22a and 22b is shown with a mobile device specific webpage 20a and 20b respectively.

The webpage creation system can enable each created mobile device specific webpage 20a and 20b for each mobile computing device 22a and 22b to be navigated using a pointer 206a and 206b respectively.

When a user 17a or 17b uses the pointer 206a or 206b, information which can take the form of one or more of popup bubbles 208a and 208b of information can appear on the mobile device specific webpage.

When the user 17a or 17b uses the pointer 206a or 206b and clicks or selects a help icon, help text can be shown in one or more help bubbles 209a and 209b.

In embodiments, the computing cloud 33 can contain a plurality of processors and data storages connected together as known in the industry.

FIGS. 2A-2B depict an administrative data storage containing the webpage creation system according to one or more embodiments.

The administrative data storage 12 can contain the webpage creation system 2.

The administrative data storage 12 can have predefined data 19c, stored data 13, and at least one mobile device specific webpage document template 15.

In embodiments, the stored data 13 can be usable by a webpage creator and inserted into the mobile device specific webpage document template 15.

In embodiments, the stored predefined data 19c can be usable by a mobile device specific webpage creator.

The predefined data 19c can be collected from third party websites and stored in the administrative data storage 12.

The administrative data storage 12 can contain at least one mobile device specific webpage 20.

A plurality of self-generating data entry screens 99 can be stored in the administrative data storage 12. The plurality of self-generating data entry screens 99 can instruct the administrative processor to create at least one mobile device specific webpage 20 for a specific selected mobile computing device which can be identified from a list of mobile computing devices and their specifications 88, which can also be stored in the administrative data storage.

To create the mobile device specific webpage for the mobile computing device, the administrative data storage can have a hypertext generator 100, wherein the administrative data storage can further instruct the administrative processor to generate automatically, hypertext from input.

The administrative data storage 12 can have a domain free interface traverser 102 to instruct the administrative processor to simultaneously: collect the predefined data 19c from at least one of the third party servers to the administrative data storage via the network, store the collected predefined data 19c in the administrative data storage 12, and maintain consistency among the collected predefined data 19c.

The administrative data storage 12 can have a replication feature 104 to instruct the administrative processor to facilitate maintaining integrity of predefined data 19c and to prevent loss of predefined data 19c as predefined data 19c moves between third party servers or between a third party server and the computing cloud, duplicating data to a secondary site.

The replication feature 104 can include computer instructions 171 to connect to a hot spare environment to capture streaming real time data and computer instructions 175 to connect to a cold spare environment to capture predefined data at a user selected unit of time, such as every Tuesday at 2 pm.

The capture of streaming real time data can occur twenty-four hours a day and seven days a week.

The administrative data storage can have computer instructions 89 to instruct the administrative processor to identify a specific mobile computing device for a mobile device specific webpage.

The administrative data storage 12 can have computer instructions 177 to instruct the administrative processor to form a search screen.

The search screen 105 can be configured with a look and feel identical to at least one of the plurality of self-generating data entry screens 99.

The search screen 105 can include a static display of images feature 115, a sliding carousel display of images feature 116, and a customizable element positioning feature 117 for unique location of an element on the mobile device specific webpage 20 as defined by at least one webpage creator.

The administrative data storage 12 can have a plurality of common stylistic rules 106 to instruct the administrative processor to enforce a common stylistic look and feel between mobile device specific webpages for the mobile computing devices among an identified group of mobile device specific webpage creators.

The common stylistic rules 106 can include a customizable cascading style sheet (CSS) 107.

The administrative data storage 12 can have a document processor 108 to instruct the administrative processor to merge predefined data 19c into the mobile device specific webpage document template 15 resident in the administrative data storage 12 to start creation of the mobile device specific webpage 20, and then store the merged mobile device specific webpage document template 15 with the predefined data 19c as the mobile device specific webpage 20 in the administrative data storage 12.

In embodiments, all of the self-generating data entry screens 99 can access simultaneously: the hypertext generator 100, the domain free interface traverser 102, the replication feature 104, the plurality of common stylistic rules 106, and the document processor 108.

The administrative data storage 12 can have a calendar processor 110 to instruct the administrative processor to produce a calendar on the mobile device specific webpage 20 for the mobile computing device.

The administrative data storage 12 can have an active/passive database record locking feature 200 for instructing the administrative processor to control access to and to modify predefined data in a way that maintains the integrity of the predefined data.

The administrative data storage 12 can have a sliding carousel function 202 for instructing the administrative processor to control viewing of multiple images simultaneously on the mobile device specific webpage of the mobile computing device in a compact, sequentially scrolling, display.

The administrative data storage 12 can have an automatic help feature 204 configured to serve as an aid to a mobile device specific webpage creator or a user using the webpage creation system.

In embodiments, the automatic help feature 204 can enable the pointer operated by the mobile device specific webpage creator or by a user of the mobile computing device to touch or link to an element on the mobile device specific webpage being created for the mobile computing device or being used on the mobile computing device. In embodiments, the pointer can be used to extract predefined data 19c and display predefined data 19c in a help bubble.

In embodiments, the automatic help feature can display predefined data 19c in a help bubble which can display help information about the embodiments or other features.

The administrative data storage 12 can have a nested relational database 302 for access by the administrative processor for developing the mobile device specific webpage by the mobile device specific webpage creator.

The administrative data storage 12 can have an operating system 304 for access by the administrative processor enabling the mobile device specific webpage creator to develop the mobile device specific webpage.

The administrative data storage 12 can use the webpage creation system 2 to form a developer user profile 306 for each mobile device specific webpage creator, and store the developer user profile in the administrative data storage 12 for access by the administrative processor for use in developing the mobile device specific webpage 20.

The administrative data storage 12 can use the webpage creation system 2 to form a user profile 307 for each user of a created mobile device specific webpage.

The administrative data storage 12 can have a transfer mechanism 308 for access by the administrative processor.

In embodiments, the transfer mechanism 308 can include computer instructions configured to transfer mobile device specific webpages between the administrative processor to third party servers, which can be connected to the network.

The administrative data storage 12 can have computer instructions 317 to instruct the administrative processor to convert the developed mobile device specific webpage to a mobile version for viewing by mobile computing devices.

The administrative data storage 12 can have computer instructions 319 to instruct the administrative processor to transmit the mobile version for display on one or more mobile computing devices.

The administrative data storage 12 can have computer instructions 321 to instruct the administrative processor to maintain a mobile version of the mobile device specific webpage for use on a mobile computing device.

The administrative data storage 12 can have computer instructions 197 to instruct the administrative processor to form a dynamic information frame.

The administrative data storage 12 can have a portable document format report template 196 for automatic population of predefined data 19c into the portable document format report template 196, which can use computer instructions 199 to instruct the administrative processor to automatically produce a portable document format report.

The administrative data storage 12 can have a domain free central indexer 401 in the administrative data storage enabling bidirectional communication through the domain free interface traverser is used to identify a set of predefined data to gather, such as warrant data.

The domain free central indexer 401 can gather the set of predefined data from the third party servers connected to the network using the domain free domain free interface traverser 102, such as gathering of warrant data from the county court system, from county sheriff's department, and from any state warrant issuing agency using the domain free central indexer.

For example, an index of current and outstanding warrants is generated using the predefined data 19c by the domain free central indexer 401 using the predefined data 19c from the multiple third party servers queried by the domain free interface traverser.

The domain free central indexer 401 can automatically receive modifications to the gathered data forming an updated index from the domain free interface traverser 102.

The search processor 408 can then search the updated index for a particular detail, such as a person named Bill Freeman.

The domain free central indexer 401 can display the search results for the particular detail, such as Bill Freeman, which can include all modifications of current and outstanding warrants, allowing a user to select a particular record and view details in the particular record, like all traffic stops for Bill Freeman.

The administrative data storage 12 can have an auto auditor 402 to instruct the administrative processor to capture modifications to the predefined data 19c, such as capture information on new warrants recently sworn out against Bill Freeman.

The auto auditor 402 can track every change to every warrant and can capture any information related to the changing of the warrant as well as a date and a time that the changes to the warrant were made.

The modifications to the predefined data 19c can be stored simultaneously on the plurality of third party servers, using the auto auditor 402 to provide before and after values of the predefined data 19c and a source of each modification to at least one self-generating data entry screen.

The administrative data storage 12 can have a reference object interface 403. The reference object interface can provide a fake file defined by a developer user. The reference object interface can enable the domain free interface traverser 102 or the administrative processor to install the predefined data 19c into a fake file to control user access to the predefined data 19c and to keep confidential a portion of the predefined data from a user without credentials.

In the case of the search for warrants sworn out for Bill Freeman, some of the records can have Bill Freeman's social security number as well as other people's social security number. The reference object interface can place a subset of the warrant information in a "fake file" to prevent persons without permission to access the social security numbers of the predefined data set. No social security numbers were pushed to the fake file using the reference object interface.

The administrative data storage 12 can have cascading menus 404 generated at login using the domain free interface traverser 102 to access the plurality of self-generating data entry screens 99 on at least one of the third party servers. Cascading menus 404 can be used to allow a user or developer user to traverse through dynamically generated links to another cascading menu, a list processor, a search processor, or one of the self-generating data entry screens 99. This can also allow the user to access any of these across a plurality of accounts across a plurality of third party servers.

For example, Bob has setup the cascading menus to allow multiple options for the users to use when accessing his server. One option is "Enter Inventory Items", while another is "List Inventoried Items". With this, any other user can use the cascading menus defined in the predefined data 19c to access either one or both of the listed items Bob has supplied.

The administrative data storage 12 can have a list processor 406. The list processor 406 can be one of the plurality of self-generating data entry screens that can create a dynamic listing of the predefined data 19c from a plurality of third party servers via the domain free interface traverser 102 for inquiries into at least one of the self-generating data entry screens. The list processor 406 can allow a user to display the dynamic listing of the predefined data 19c, and within this listing the user is allowed to sort the columns displayed in the listing as well as have the listing build a selection to pass to another list processor operation to display a more detailed listing to display.

For example, John decides he want to see all of the items in the inventory system that Bob has built, which have a description starting with the word "Patrol". With this, John can use the List Processor to display a dynamic listing based upon the description that John has chosen. Using the listing, John can see all the items in the predefined data 19c that have the description starting with the word "Patrol". This list allows John to access the self-generating data entry screens 99 in an inquiry mode to see the inventory item that was displayed in the list processor.

The administrative data storage 12 can have a search processor 408. The search processor 408 can be one of the plurality of self-generating data entry screens 99 used to collect search criteria for predefined data 19c from a plurality of third party servers and search any index to limit the output. The search processor 408 can also be the starting point for a report processor function to allow the user to collect entered data for display within the report generated.

As an example, Mary decides to search for inventory items that begin with the word "Patrol" using the Search Processor. The Search Processor is one of the self-generating data entry screens 99 setup by Bob for users to search the predefined data 19c in the inventory system. With this, Bob allowed Mary to search the description field of the predefined data 19c and the index and return the results in the list processor 406.

The administrative data storage 12 can have a webpage process definition builder 410. The webpage process definition builder 410 can be used to create, modify, view, and delete pre-defined data 19c used for the creation of the plurality of self-generating data entry screens 99.

The webpage process definition builder 410 can be used to create layouts for the plurality of self-generating data entry screens 99. The customized plurality of self-generating data entry screens 99 enable users to create, modify, view, and delete the definition stored in the predefined data 19c that controls how the plurality of self-generating data entry screens 99 are built and displayed to the user.

The webpage process definition builder 410 only allows a user to select from preset fields in the administrative data storage 12 to build the self-generating webpage data entry screens layout while providing validity checks preventing a user from selecting incorrect fields, and simultaneously provide a standardized layout for mobile devices enforcing common stylistic rules 106 and a common look and feel to the mobile device webpage.

For example, Bob uses the webpage process definition builder 410 to create a data entry screen for at least one mobile computing device to allow the user to enter and track the information for a product inventory system, such as for furniture. Bob specifically defines the definition as having three parts, (i) an item number, such as a bar code number, (ii) a furniture description, such as brown leather couch, and (iii) a storage location, such as the warehouse on Fourth Avenue in Nashville. With the webpage process definition builder 410, when Bob saves the definition, the user can using the definition, access Bob's data using the plurality self-generating data entry screen 99.

The administrative data storage 12 can have a file and setting builder 412. The file and settings builder 412 can be one of the plurality of self-generating data entry screens 99, which can be used to identify the predefined data 19c for gathering across the third party servers. The file and setting builder 412 can also create files that contain gathered predefined data 19c, can be stored in the administrative data storage 12.

For example, Bob uses the file and setting builder 412 to identify predefined data needed to create his inventory file. Bob can also use the file and setting builder 412 to create a file and store the gathered predefined data file in the administrative storage 12. With the file and setting builder 412, Bob can define a format for storing predefined data 19c.

The administrative data storage 12 can have a reference object builder 414. The reference object builder 414 can be one of the plurality of self-generating data entry screens 99 that can be used to create, modify, view, and delete the predefined data 19c needed for the operation of the reference object interface. In embodiments, the reference object builder 414 can allow for a developer or user to define the fields to be displayed to outside parties. The fields defined can be pulled from one or more data files across one or more third party servers. Along with the definition of the fields, the reference object builder 414 can also allow for a developer or creator, or user to write custom computer instructions to handle the file operations against the fake file.

For example, Bob uses the reference object builder to create a fake file to allow an outside or third party server access to inquire into the inventory system. Bob defines the fake file to allow the user to see only the inventory description, and location of the inventoried item, leaving out an inventory number. Restricting access to only the ability to view the information defined without allowing modifications.

The administrative data storage 12 can have an account and file access management builder 416. The account and file access management builder 416 can be one of the plurality of self-generating data entry screens 99 that can be used to create, modify, view, and delete the predefined data 19c used access controls and replication controls.

In embodiments, the account and file access management builder 416 can allow the user to define the level of access a third party has to the account and or files within the data storage as far as read, write and selection of predefined data. Additionally, the account and file access management builder 416 can allow the user to define the access permissions at the data file level as opposed to an overall account level access.

For example, John and Bob decide they wish to replicate the system that Bob has to another server that John has for a subset of the predefined data 19c. With this, Bob uses the account and file access management builder 416 to defined the accounts, and limit the data files that are to be replicated to John's server. Bob is allowing only the Inventory Files to be replicated in the account, and not any user definitions to be replicated to John's Server.

Figure 3:
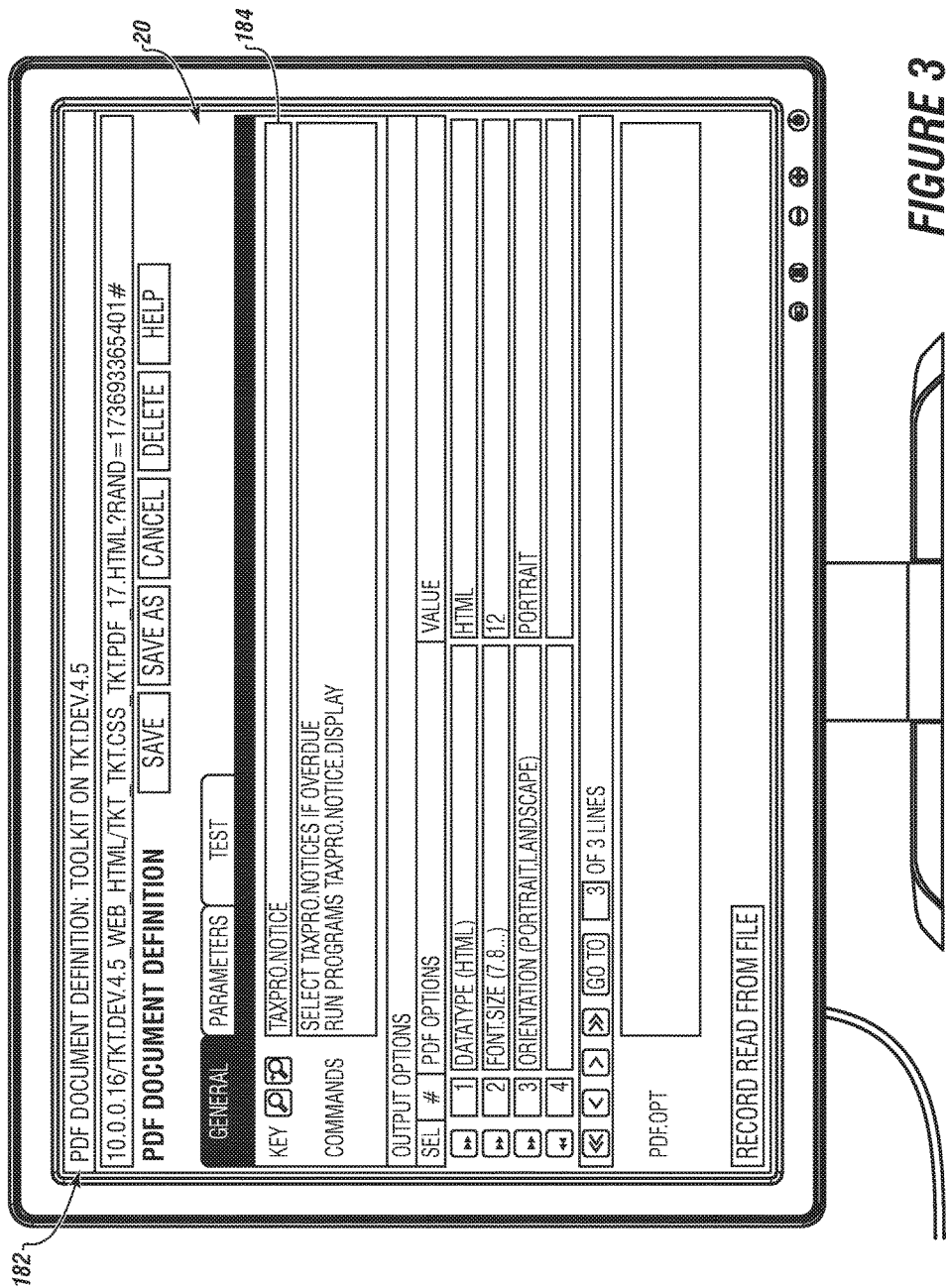
FIG. 3 depicts a non-mobile computing device webpage using the webpage creation system according to one or more embodiments.

FIG. 3 depicts a non-mobile computing device webpage using the webpage creation system according to one or more embodiments.

The webpage 20 is shown within a dynamic information frame 182 configured as a web window within a web window, each web window containing different self-generated data entry screens.

The webpage 20 is shown with at least one required data entry field 184 as defined by a developer user.

Figure 4:
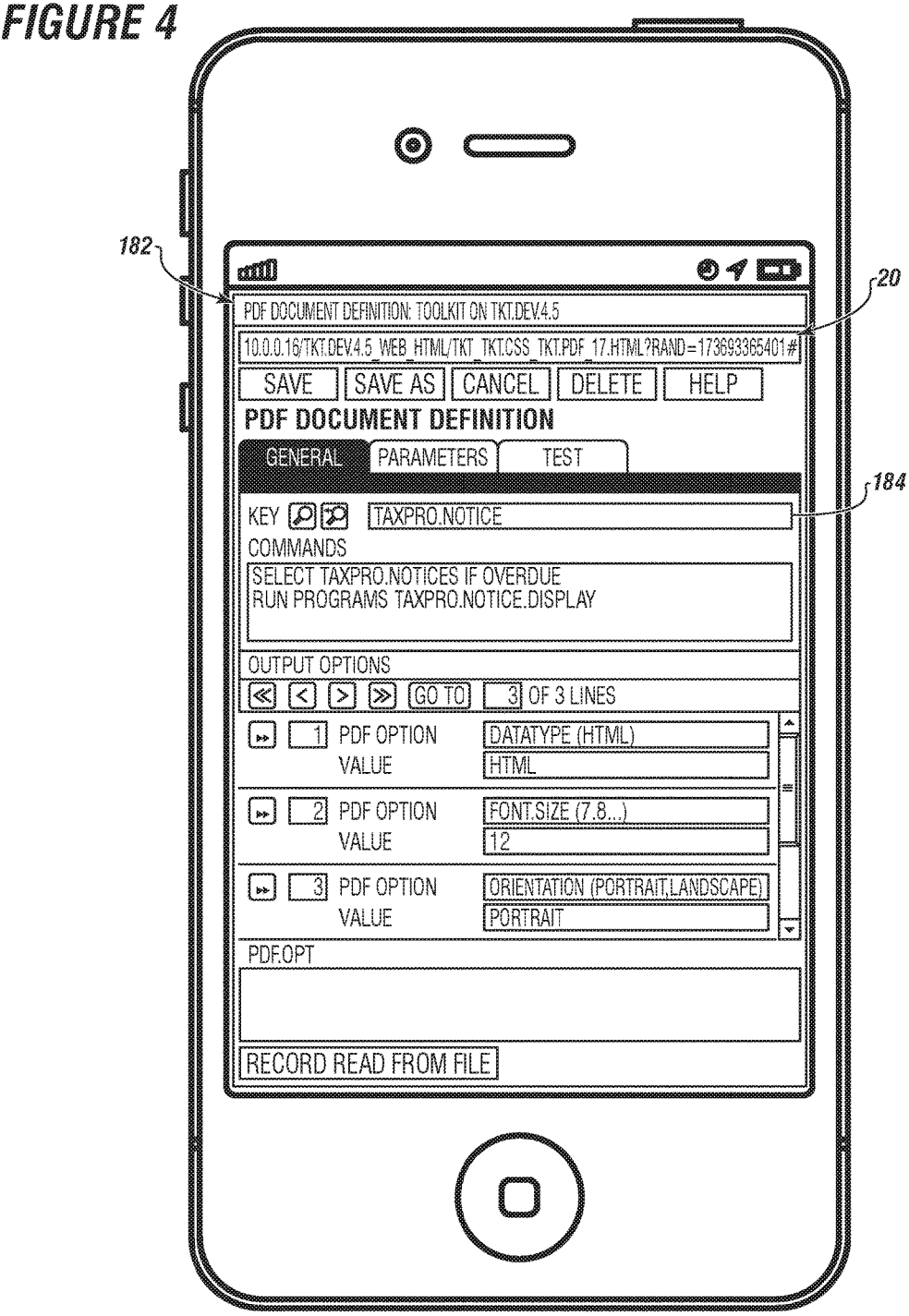
FIG. 4 depicts a mobile computing device webpage using the webpage creation system according to one or more embodiments.

FIG. 4 depicts a mobile device specific device webpage using the webpage creation system according to one or more embodiments.

The webpage 20 is shown within a dynamic information frame 182 configured as a web window within a web window, each web window containing different self-generated data entry screens.

The webpage 20 is shown with at least one required data entry field 184 as defined by a developer user.

As an example of using the webpage creation system and system, Bob the mobile device specific webpage creator with his laptop computer logs into the administrative processor.

Bob requests one of the self-generating data entry screens, which is the document processor from the webpage creation system.

Bob uses the document processor from the webpage creation system to activate the hypertext generator to create a mobile device specific webpage using the mobile device specific webpage document template in the administrative data storage, such as mobile device specific webpage for Tax Pro LLC, for public inquiry in property taxes due and payment of those property taxes.

Bob relies on one of the plurality of common stylistic rules in the administrative data storage to instruct the administrative processor to enforce a common stylistic look and feel between mobile device specific webpages for the mobile computing device among an identified group of developer users because he is one of an identified group of mobile device specific webpage creators, such as the Tax Pro branding design.

The mobile device specific webpage for the mobile computing device in progress connects to the domain free interface traverser of the webpage creation system to collect predefined data from two different third party servers on the network, simultaneously, while the webpage creation system maintains integrity between the collected data, such as a Harris County Tax Registry listing real property parcels and an INA credit card processor enabling payment of tax on those Harris Country Tax Registry real property parcels.

Bob relies on the replication feature of the webpage creation system to not lose the predefined data as the predefined data moves between the third party servers and Bob's computer, as an example, the replication can be an automatic "save as" for the predefined data changed by Bob's computer.

Bob can test the developed mobile device specific webpage by logging into a mobile computing device and viewing the completed mobile device specific webpage.

In embodiments, multiple mobile device specific webpages can be developed and linked together using the webpage creation system.

In embodiments, the webpage creation system can have the administrative processor and the administrative data storage as part of the computing cloud.

In embodiments, the network can be a local area network, a wide area network, a global communication system, a satellite network, a cellular network, a computing cloud, a similar network known in the industry, and combinations thereof.

In embodiments, the predefined data can be at least one of: digital content, digital images, and analog information. The digital content, digital images and analog information can each be retrievable and accessible by an inquiry.

FIG. 5 is an exemplary filled in portable document format report template according to one or more embodiments.

In this embodiment, the portable document format report template 196 is shown here as a tax bill for automatic population of predefined data 19 into the portable document format report template which use computer instructions in the administrative data to automatically produce the portable document format report.

The portable document format report template 196 can have information and elements, such as element 202, shown here as real or personal property parcel number 1234, element 204, shown here as address 1: 123 Simple Street, element 206, shown here as address 2: suite 12, element 208, shown here as city: Austin, element 210 shown here as state: Texas, and element 212, shown here as zip code: 78701.

While these embodiments have been described with emphasis on the embodiments, it should be understood that within the scope of the appended claims, the embodiments might be practiced other than as specifically described herein.

What is claimed is:

1. A webpage creation system for developing a mobile device specific webpage for at least one mobile computing device comprising:
   a) an administrative processor in communication with a network;
   b) an administrative data storage in communication with the administrative processor;
   c) a plurality of data entry screen definitions for creating the mobile device specific webpage in the administrative data storage;
   d) a list of mobile computing devices and specifications in the administrative data storage for displaying the mobile device specific webpage;
   e) computer instructions in the administrative data storage to instruct the administrative processor to identify a specific mobile computing device for the mobile device specific webpage;
   f) a plurality of self-generating data entry screens in the administrative data storage for entering and storing predefined data for use on the mobile device specific webpage;
   g) a hypertext generator stored in the administrative data storage to instruct the administrative processor to automatically generate hypertext for the mobile device specific webpage using the predefined data;
   h) a domain free interface traverser in the administrative data storage configured to bidirectionally control communication, data delivery and access permission, to and from each third party server of a plurality of third party servers connected to the network to automatically collect, store and maintain data integrity of data processed for each third party server of the plurality of third party servers and consistency of the predefined data collected from the plurality of third party servers using the network, wherein the domain free interface traverser collects the predefined data via the mobile device specific webpage from more than one third party server of the plurality of third party servers on the network and updates the predefined data via the mobile device specific webpage to more than one third party server of the plurality of third party servers on the network simultaneously;
   i) a replication feature in the administrative data storage to instruct the administrative processor to maintain integrity of the predefined data and to prevent loss of the predefined data while simultaneously duplicating the predefined data to a hot spare environment and a cold spare environment;
   j) a plurality of common stylistic rules in the administrative data storage to instruct the administrative processor to enforce a common stylistic look and feel for use on the mobile device specific webpage and maintain consistency between additionally developed mobile device specific webpages for the specific mobile computing device;
   k) a domain free central indexer in the administrative data storage enabling bidirectional communication through the domain free interface traverser to:
      (i) identify a set of predefined data to gather from the plurality of third party servers;
      (ii) gather the predefined data from the plurality of third party servers connected to the network;
      (iii) generate an index using the set of predefined data;

(iv) incorporate modifications to the set of predefined data forming an updated index;
(v) search the updated index for a particular detail; and
(vi) display search results in the plurality of self-generating data entry screens allowing a user to select a particular record;
l) an auto auditor in the administrative data storage to instruct the administrative processor to capture modifications to the predefined data as the predefined data is stored simultaneously on the plurality of third party servers, and to provide before and after values of the predefined data and a source of each modification to at least one of the plurality of self-generating data entry screen;
m) a document processor in the administrative data storage to instruct the administrative processor to merge the predefined data into a document template automatically and generate the mobile device specific webpage for the specific mobile computing device while storing a generated mobile device specific webpage in the administrative data storage enabling a non-administrative user to create the mobile device specific webpage filled with the predefined data with the plurality of data entry screen definitions using the plurality of common stylistic rules; and
n) computer instructions in the administrative data storage to instruct the administrative processor to transmit the generated mobile device specific webpage via the network for display on the specific mobile computing device.

2. The webpage creation system of claim 1, comprising a reference object interface in the administrative data storage enabling the domain free interface traverser or the administrative processor to install the predefined data into fake files to control user access to the predefined data and to keep confidential a portion of the predefined data from the user without credentials.

3. The webpage creation system of claim 1, comprising a cascading menu generated at login using the domain free interface traverser to access the plurality of self-generating data entry screens on at least one of the plurality third party servers.

4. The webpage creation system of claim 1, comprising a list processor for creating a dynamic listing of the predefined data from the plurality of third party servers via the domain free interface traverser for inquiries into at least one of the plurality self-generating data entry screens.

5. The webpage creation system of claim 1, comprising a search processor for collecting search criteria for the predefined data from the plurality of third party servers via the domain free interface traverser and to search any generated updated index.

6. The webpage creation system of claim 1, comprising a webpage process definition builder enabling creation of a self-generating data entry screens layout, validity checks on user selected fields, and simultaneously provide a standardized layout for the mobile device specific webpage enforcing the plurality common stylistic rules and the common look and feel.

7. The webpage creation system of claim 1, comprising a file and setting builder for identifying the predefined data for gathering across the plurality of third party servers using the domain free interface traverser and creating files that contain gathered predefined data and storing created files in the administrative data storage.

8. The webpage creation system of claim 2, comprising a reference object builder for identifying the predefined data for gathering across the plurality third party servers using the domain free interface traverser and creating the fake files that contain a subset of the gathered predefined data, and storing the created fake files in the administrative data storage.

9. The webpage creation system of claim 2, comprising an account and file access management builder to control individual user access and management access to actual files and the fake files and replication of the actual files.

10. The webpage creation system of claim 1, further comprising a calendar processor in the administrative data storage to instruct the administrative processor to produce a calendar on the mobile device specific webpage.

11. The webpage creation system of claim 1, wherein the administrative processor and the administrative data storage are part of a computing cloud.

12. The webpage creation system of claim 1, wherein the network comprises at least one of: a local area network, a wide area network, a global communication system, a satellite network, a cellular network, the computing cloud, or combinations thereof.

13. The webpage creation system of claim 1, wherein the predefined data comprises at least one of: digital content, digital images, and analog information, wherein the digital content, digital images and analog information are retrievable and accessible by an inquiry.

14. The webpage creation system of claim 1, comprising:
a) a nested relational database in the administrative data storage for access by the administrative processor for developing the mobile device specific webpage for the at least one mobile computing device;
b) an operating system in the administrative data storage for access by the administrative processor for developing the mobile device specific webpage for the at least one mobile computing device;
c) a developer user profile in the administrative data storage for access by the administrative processor for developing the mobile device specific webpage for the at least one mobile computing device; and
d) a transfer mechanism in the administrative data storage for access by the administrative processor enabling transfer of the mobile device specific webpage to another administrative processor connected to the network using the developer user profile or a user profile of the non-administrative user.

15. The webpage creation system of claim 1, comprising an active/passive database record locking feature in the administrative data storage for instructing the administrative processor to control access to modify the predefined data to maintain the predefined data integrity.

16. The webpage creation system of claim 1, comprising a sliding carousel function in the administrative data storage to instruct the administrative processor to control viewing of multiple images simultaneously on the mobile device specific webpage generated by the webpage creation system for the at least one mobile computing device in a compact sequentially scrolling display.

17. The webpage creation system of claim 1, comprising an automatic help feature in the administrative data storage to instruct the administrative processor to serve as an aid to a mobile device specific webpage creator, enabling the non-administrative user of the at least one mobile computing device to operate a pointer to touch or link to an element on the mobile device specific webpage, extract the predefined data and display the predefined data in a help bubble on the mobile device specific webpage of the at least one mobile computing device.

18. The webpage creation system of claim 1, comprising computer instructions to present a search screen in the administrative data storage to instruct the administrative processor to present the search screen configured with the look and feel identical to at least one of the plurality of self-generating data entry screens, the computer instructions to present the search screen further comprising:

a) a static display of images feature; and
   b) a sliding carousel display of images feature.

19. The webpage creation system of claim 1, comprising a customizable cascading style sheet in the administrative data storage for use with the plurality of common stylistic rules.

20. The webpage creation system of claim 1, wherein the hot spare environment captures streaming real time data twenty-four hours a day and seven days a week and the cold spare environment captures the predefined data at the non-administrative user's selected time intervals.

21. The webpage creation system of claim 1, comprising a dynamic information frame configured as a web window within a web window, each web window containing different self-generated data entry screens.

22. The webpage creation system of claim 1, comprising at least one required data entry field as defined by the non-administrative user.

23. The webpage creation system of claim 1, comprising a portable document format report template for automatic population of the predefined data into the portable document format report template automatically producing a portable document format report comprising information and elements.

24. The webpage creation system of claim 1, wherein the hypertext generator uses the plurality of data entry screen definitions to generate the plurality of self-generating data entry screens with the predefined data.

\* \* \* \* \*